United States Patent [19]

Kondo et al.

[11] Patent Number: 5,291,283
[45] Date of Patent: Mar. 1, 1994

[54] DECODING APPARATUS OF A COMPRESSED DIGITAL VIDEO SIGNAL

[75] Inventors: Tetsujiro Kondo; Yasuhiro Fujimori, both of Kanagawa; Akemi Noda, Tokyo, all of Japan

[73] Assignee: Sony Corporation, Tokyo, Japan

[21] Appl. No.: 915,527

[22] Filed: Jul. 20, 1992

[30] Foreign Application Priority Data

Jul. 24, 1991 [JP] Japan .................. 3-207415

[51] Int. Cl.$^5$ ............... H04N 7/130; H04N 7/133
[52] U.S. Cl. ........................... 348/390; 348/415
[58] Field of Search ............... 358/136, 133; H04N 7/130, 7/133

[56] References Cited

U.S. PATENT DOCUMENTS

| | | | |
|---|---|---|---|
| 5,005,076 | 4/1991 | Stroppina et al. | 358/136 |
| 5,028,995 | 7/1991 | Izawa et al. | 358/136 |
| 5,136,371 | 8/1992 | Savatier et al. | 358/136 |
| 5,136,378 | 8/1992 | Tsurube | 358/136 |
| 5,150,432 | 9/1992 | Ueno et al. | 358/136 |

Primary Examiner—Tommy P. Chin
Assistant Examiner—Richard Lee
Attorney, Agent, or Firm—William S. Frommer; Alvin Sinderbrand

[57] ABSTRACT

Encoded picture data or encoded difference data is decoded by an intraframe decoder. To an adder, zero data is given through a switching circuit at the time of the decoding of intraframe coded data, and when interframe coded data, i.e., difference data is decoded, a decoded value of a previous frame is supplied through the switching circuit. By the adder, the decoded value of the previous frame and the decoded difference value are added to allow the decoding of interframe coding.

3 Claims, 4 Drawing Sheets

DECODING APPARATUS OF A COMPRESSED DIGITAL VIDEO SIGNAL

BACKGROUND OF THE INVENTION

1. Field of the Invention

This invention relates to decoding apparatus of a digital video signal compressed by highly efficient coding.

2. Description of the Prior Art

When a digital video signal is transmitted or recorded/reproduced, highly efficient coding for compressing data is frequently employed. The highly efficient coding compresses the transmission data by using spatial correlation and time correlation of an image. For highly efficient coding of a video signal, intraframe encoding and interframe encoding are known. A difference lies in that data to be encoded is intraframe picture data or a difference between two consecutive frames in time between these encoding.

For an example of the highly efficient coding, transform coding is known. The transform coding, particularly two-dimensional ones, divides picture data into blocks of (8×8) picture elements, for example, and performs orthogonal transformation for each block. Transformation components (called coefficient data) are their direct current components and high frequency components. Generally, since the direct current components are large and the high frequency components are small, the bit number as a whole can be reduced by allocating an appropriate bit number to each coefficient. Recently, DCT (Discrete Cosine Transform) has particularly been drawing attention.

In the case of the intraframe coding, picture data of one frame is segmented into two-dimensional blocks such as (8×8), and each block is DCT-encoded. Further, by DCT-encoding a difference between two consecutive frames in terms of time, interframe coding is achieved. In general, the intraframe coding does not need a frame memory to thereby reduce the hardware size but the data compression rate is low. On the other hand, the interframe coding requires a frame memory but the data compression rate is high. In view of these points, when highly efficient coding is adopted in a digital VTR, an encoding method to be employed is selected in consideration of the tape consumption amount at the time of recording. Also, it is considered that in a camera-integrated VTR, the interframe coding is adopted, while in a stationary VTR, the intraframe coding is used.

However, when there is a difference between the highly efficient coding methods in two kinds of digital VTRs, a picture recorded by one VTR cannot be reproduced by the other.

OBJECTS AND SUMMARY OF THE INVENTION

An object of the present invention is, therefore, to provide decoding apparatus of a digital video signal capable of decoding data encoded in each of the intraframe coding and interframe coding to provide excellent compatibility.

According to an aspect of the invention, there is provided a decoding apparatus for decoding an input compressed digital video signal;

input terminal selectively supplied with one of first intraframe compressed digital video signal and second interframe compressed digital video signal, decoding circuit supplied with the signal from the input terminal for generating a decoded signal, frame memory for storing the decoded signal, selecting circuit for selecting one of the output of the frame memory and a pre-determined value, the selecting circuit selecting the output of the frame memory when the second signal is supplied to the input terminal and the selecting circuit selecting the predetermined value when the first signal is supplied to the input terminal, adder for adding the outputs of the decoder circuit and the selecting circuit, the output of the adder being supplied to the frame memory.

Input data encoded by each of the intraframe coding method and the interframe coding method can be decoded to constitute decoding apparatus with excellent compatibility.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
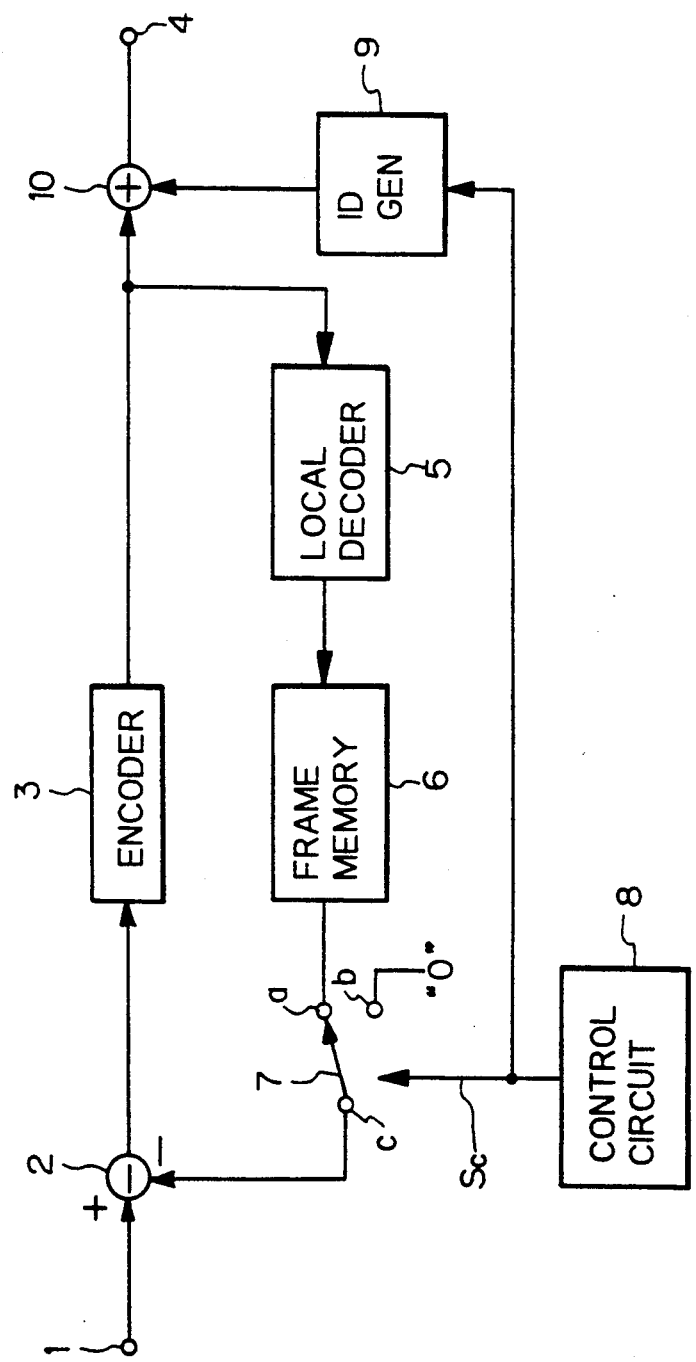
FIG. 1 is a block diagram of an encoding system to which this invention is applicable.

Hereunder, an embodiment of this invention will be described referring to the drawings. First, an encoding system will be described with reference to FIG. 1. In FIG. 1, a digital video signal is supplied to an input terminal indicated at 1. This digital video signal is given to a subtractor 2. Output data of the subtractor 2 is supplied to encoder 3, an intraframe coder. Encoded output of the encoder 3 is taken out at an output terminal 4 and supplied to a local decoder 5. Decoded output of the local decoder 5 is written into a frame memory 6. Read-out output of the frame memory 6 is given to an input terminal "a" of a switching circuit 7. Though not shown, magnetic heads (generally plural heads) are connected to the output terminal 4 through a channel encoder, a recording amplifier, etc. The magnetic heads are attached onto a rotating drum so that recording data is recorded on oblique tracks on a magnetic tape.

Zero data has been supplied to the other input terminal "b" of the switching circuit 7. Data from an output terminal "c" of the switching circuit 7 is given to a subtractor 2 as a subtractor input. The switching circuit 7 is generated by a control circuit 8, and switched by a control signal Sc for designating the intraframe coding and the interframe coding. Specifically, when the intraframe coding is designated, the input terminal "b" and the output terminal "c" of the switching circuit 7 are connected, while when interframe coding is designated, its input terminal "a" and output terminal "c" are connected. The control signal Sc is supplied from the control circuit 8, in response to a user's operation, for example. Selection of the intraframe or interframe coding is made considering the kind of input video signals (i.e., high definition television signal or standard televisions signal), the tape amount needed for recording, desired picture quality, and so on. If necessary, the ID signal is generated by an ID signal generator 9 on the basis of the control signal Sc. The signal could be inserted into the predetermined position of the encoding data every frame.

Figure 3A:
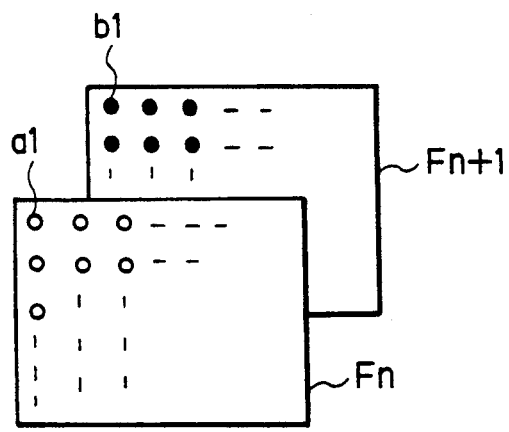
FIGS. 3A and 3B are a schematic diagram for explaining an encoding method of one embodiment of the invention.
Figure 3B:
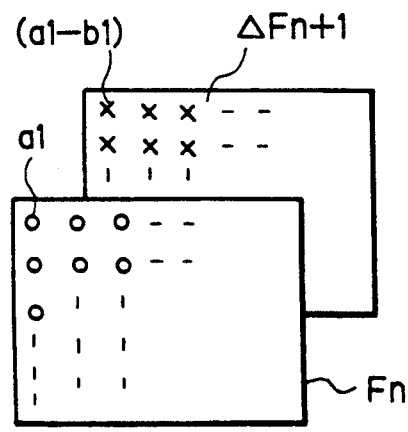

Referring to FIGS. 3A and 3B, encoding of the embodiment will be described. FIG. 3A shows two frames Fn and Fn+1 consecutive in time. When intraframe encoding is performed by the encoder 3, each frame is encoded by DCT, for example. Namely, each of the frames Fn, Fn+1 is divided into two-dimensional blocks such as (8×8), each block is DCT converted, coefficient data of (8×8) is developed, and this coefficient data is quantized and then variable-length encoded. In the intraframe coding, zero data is given to the subtractor 2 through the switching circuit 7. As a result, input video data is generated from the subtractor 2.

In the case of the interframe coding, for preventing error propagation, the frame Fn is intraframe coded among the two frames as mentioned above, and with respect to the next frame Fn+1, the interframe coding, that is, the frame difference $\Delta Fn+1$ is encoded. As shown in FIG. 3B, a difference between two picture elements located at the same position in each frame, for example a1 and b1, is DCT-encoded. The size of a block of DCT is made equal to that of the interframe coding, and picture element data is replaced by the interframe difference $\Delta Fn+1$. With respect to next two frames to the two frames indicated in FIG. 3B, with the same manner mentioned above, a first frame is intraframe coded, and as to the next frame, the interframe coding is made. Hereunder, this frame encoding process is repeated for every two frames. This period may be also equal to or more than 3 frames.

In the interframe coding, since the input terminal "a" and the output terminal "c" of the switching circuit 7 are connected to each other, output data of a frame memory 6 is supplied to the subtractor 2 through the switching circuit 7. A local decoder 5 performs processing reverse with the encoder 3, that is, decoding of second-dimensional DCT. Namely, with respect to two frames indicated in FIG. 3A, data of a first frame Fn is encoded by the encoder 3, and in this frame, an input terminal "b" and the output terminal "c" of the switching circuit 7 are connected to each other. Data of the frame Fn+1 is then decoded at the local decoder 5, and through the frame memory 6 and the switching circuit 7, a difference $\Delta Fn+1$ between data of frame Fn+1 and a decoded output of the previous frame Fn is developed in the subtractor 2. The interframe difference is encoded at the encoder 3.

Figure 2:
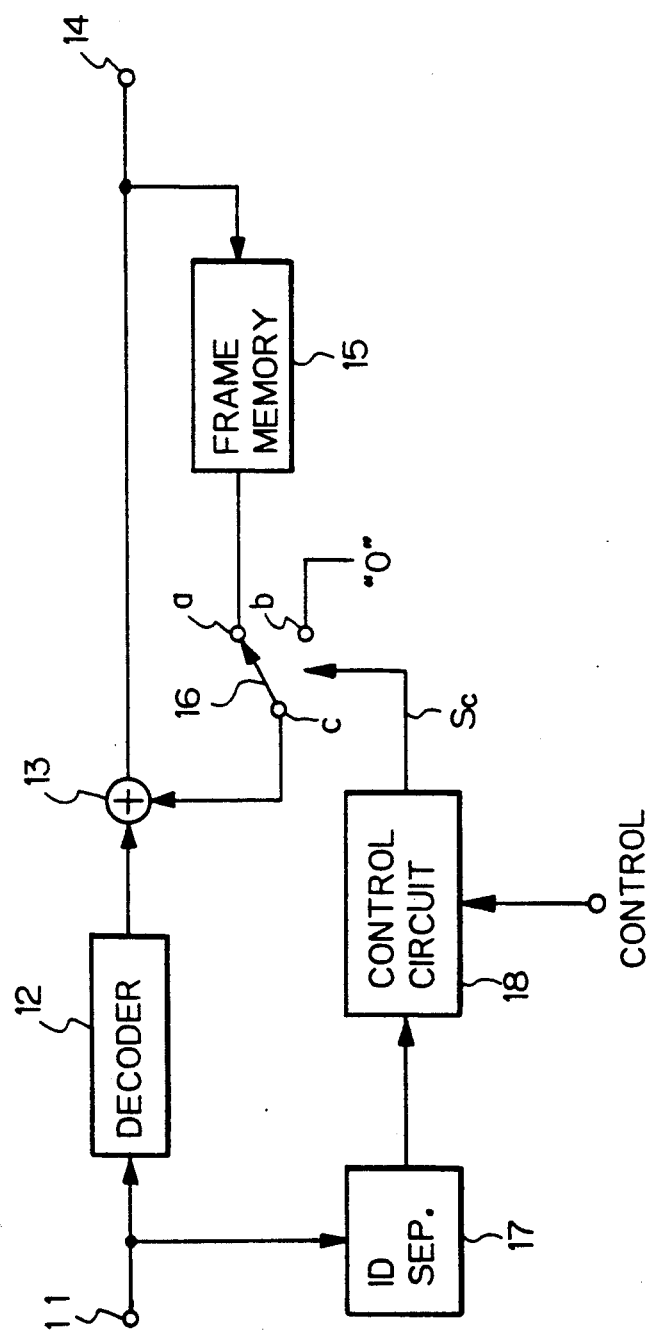
FIG. 2 is a block diagram of one embodiment of the invention.

FIG. 2 is an embodiment of decoding equipment according to this invention corresponding to the above-mentioned encoding system. To an input terminal indicated at 11, reproduction data reproduced through a magnetic head from the magnetic tape, sent via a reproducing amplifier, etc. is supplied. The reproduction data is given to an intraframe decoder 12. The intraframe decoder 12 includes a decoder of variable length code, a representing value-developing circuit which performs reverse processing with quantization, inverse DCT-transforming circuit, etc. A decoded output of the intraframe decoder 12 is supplied to an adder 13. An output of the adder 13 is taken out at an output terminal 14 and written into a frame memory 15.

An output read from the frame memory 15 is given to an input terminal "a" of a switching circuit 16. Zero data is supplied to the other input terminal "b" of the switching circuit 16. An output terminal "c" of this switching circuit 16 is connected to the adder 13. The switching circuit 16 is switched by a control signal Sc. The control signal Sc is generated by the control circuit 18 in response to the type (i.e., intraframe coding or interframe coding) of the encoding process of reproduction data given to the input terminal 11. In order to identify the type, the reproduction data are supplied to the ID code separating circuit 17. The ID signal from ID code separating circuit 17 is supplied to the control circuit 18. Further, the control circuit 18 receives a control signal generated from a tape cassette, user's operation of mode selecting switch and so on.

In the case where reproduction data given to the input terminal 11 has been subjected to the intraframe coding, an input terminal "b" and the output terminal "c" of the switching circuit 16 are connected to each other. The reproduction data is subjected to the decoding processing for every frame at the intraframe decoder 12, and decoded video data is provided at the output terminal 14.

When reproduction data supplied to the input terminal 11 has been subjected to the intraframe coding and the interframe coding, the input terminals "a" and "b" of the switching circuit 16 are connected to the output terminal "c" for every frame. An intraframe-encoded first frame of the input reproduction data is decoded at the intraframe decoder 12, and picture data of that frame is decoded. Decoded data of the first frame is taken out at the output terminal 14 and supplied to the frame memory 15.

Next interframe coding data, that is, input data of frame difference is decoded at the intraframe decoder 12, and a decoded output of the difference data is obtained. This decoded value is supplied to the adder 13. Since decoded data of a previous frame is supplied to the adder 13 through the switching circuit 16, picture data of a subsequent frame is produced from the adder 13. The output data of the adder 13 is taken out at the output terminal 14.

Last, an example of the encoder 3 of FIG. 1 and an example of the local decoder 5 of FIG. 1 will be described with reference to FIGS. 4 and 5, respectively.

Figure 4:
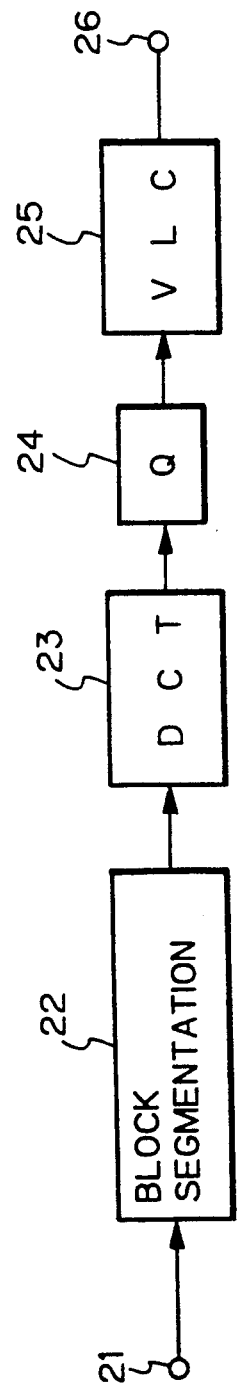
FIG. 4 is a block diagram of an example of an encoder.

In FIG. 4, a signal from an input terminal 21 (in FIG. 1, this signal is an output from the subtraction circuit 2) is sent to a block segmentation circuit 22. The block segmentation circuit 22 performs a scanning conversion such as dividing a digital image signal in normal raster scanning sequence into for example 8×8 blocks. A cosine transformation (DCT) circuit 23 two-dimensionally transforms the digital image signal, which is block segmented, and outputs the transformed coefficient data one after the other. These coefficient data from the DC coefficient to the 63-rd order AC coefficient are output in a predetermined sequence. The DCT circuit 23 sends the coefficient data to a quantization circuit 24. The quantization circuit 24 quantifies the coefficient data in a predetermined manner and sends the resultant data to a variable length coding (VLC) circuit 25. The VLC circuit 25 compresses and encodes the quantized data. The resultant data is obtained from an output terminal 26. The VLC circuit 25 is for example a run-length Huffman encoding circuit.

Figure 5:
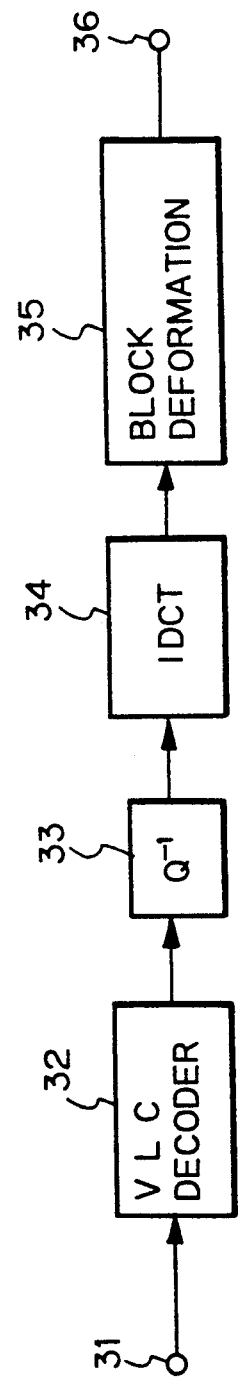
FIG. 5 is a block diagram of an example of a local decoder.

FIG. 5 is a schematic diagram showing a construction of a decoder which decodes data which was encoded in the afore-mentioned manner. Encoded data from an input terminal 31 is sent to a VLC decoding circuit 32. The VLC decoding circuit 32 performs VLC decoding. Then, the decoded data is sent to a representing value generation circuit 33. The representing value generation circuit 33 generates a representing value of the signal quantized by the quantization circuit of FIG. 4. The representing value corresponds to coefficient data. This coefficient data is sent to an inverse DCT circuit 34. The inverse DCT circuit 34 transforms the coefficient data into data with the original level. This data is sent to a block deformation circuit 35. The block deformation circuit 35 converts the block sequencing signal into the raster scanning sequencing signal. The resultant signal is obtained form an output terminal 36.

The invention allows decoding of data encoded by each of intraframe coding and interframe coding with a common circuit structure and provides improved compatibility. As a result, the cassette which is recorded by a camera-integrated VTR or a stationary VTR can be easily reproduced by applying the present invention to the stationary VTR.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A decoding apparatus for decoding a compressed digital video input signal, comprising:

input terminal means selectively supplied with said compressed digital video input signal from one of a first type video signal and a second type video signal, said first type video signal comprising an intra-frame compressed digital video signal and said second type video signal comprising an interframe compressed digital video signal, decoding means supplied with said compressed digital video input signal from said input terminal means for generating a decoded signal, frame memory means for storing said decoded signal, selecting means for selecting from between an output of said frame memory means and a pre-determined value, said selecting means selecting the output of said frame memory means when said second type video signal is supplied to said input terminal means and selecting the predetermined value when said first type video signal is supplied to said input terminal means, and adder means for forming a summed output by adding an output from said decoding means to an output from said selecting means, the summed output being supplied to said frame memory means.

2. A decoding apparatus for decoding a compressed digital video input signal, comprising:

input terminal means selectively supplied with said compressed digital video input signal from one of a first type video signal and a second type video signal, said first type video signal comprising an intra-frame compressed digital video signal and said second type video signal comprising an interframe compressed digital video signal, wherein said first type video signal and said second type video signal include an identification signal indicating whether said compressed digital video input signal is of said first type video signal or of said second type video signal, decoding means supplied with said compressed digital video input signal from said input terminal means for generating a decoded signal, frame memory means for storing said decoded signal, selecting means for selecting from between an output of said frame memory means and a pre-determined value, said selecting means selecting the output of said frame memory means when said second type video signal is supplied to said input terminal means and selecting the predetermined value when said first type video signal is supplied to said input terminal means, and adder means for forming a summed output by adding an output from said decoding means to an output from said selecting means, the summed output being supplied to said frame memory means, identification signal separating means for separating said identification signal from said first type video signal and from said second type video signal, and control circuit means for generating a control signal based on said identification signal, said control signal supplied to said selecting means for controlling whether said selecting means selects said output of said frame memory means or said predetermined value.

3. A decoding apparatus according to claim 2, wherein said first type video signal and said second type video signal include coefficient information generated by a discrete cosine transform and said decoding means includes inverse discrete cosine transform means for converting said coefficient information into level information.

* * * * *